Patented Apr. 10, 1934

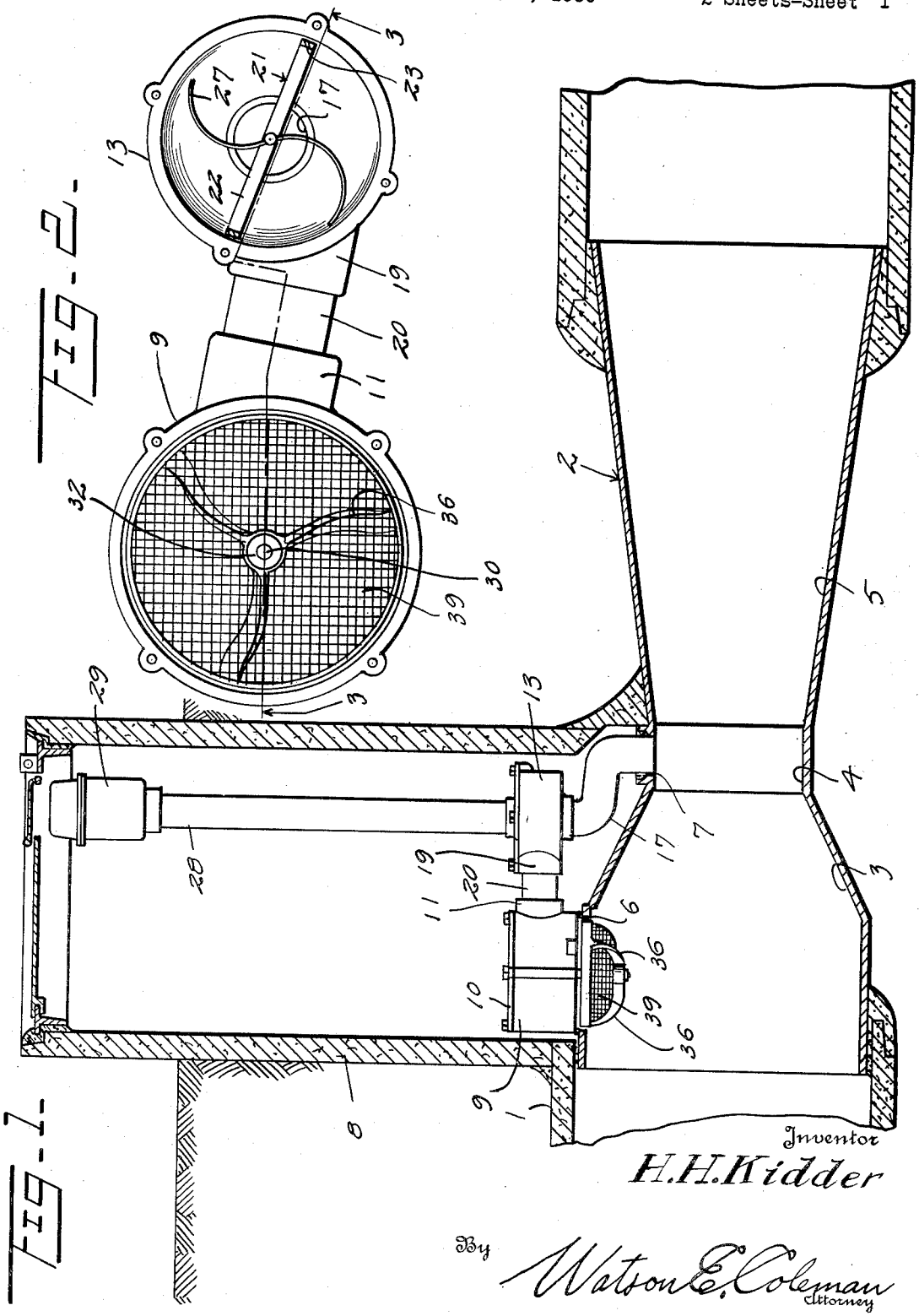

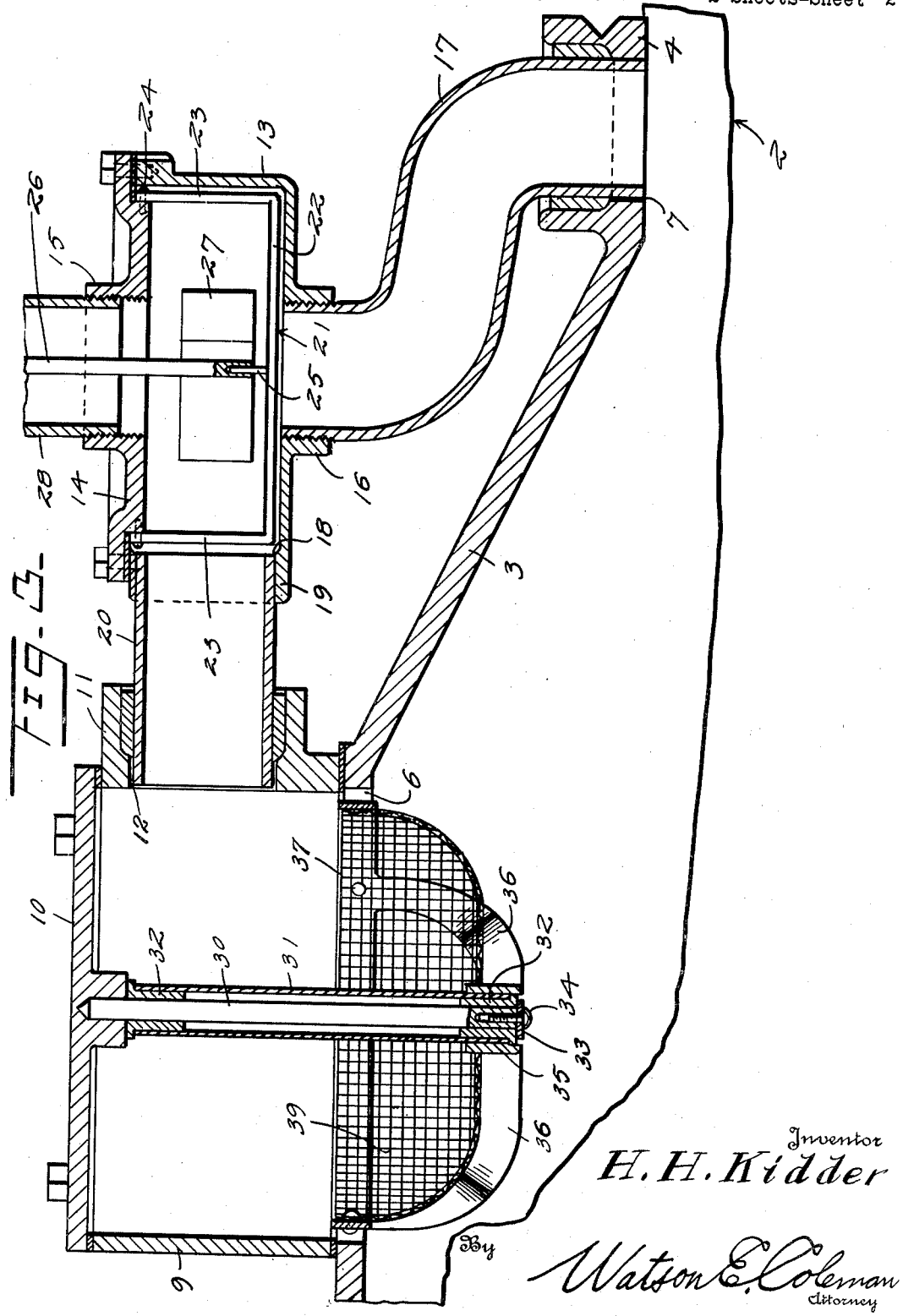

1,954,386

UNITED STATES PATENT OFFICE 1,954,386

WATER METER FOR PIPE LINE SYSTEMS

Harold H. Kidder, San Juan, Tex.

Application December 2, 1930, Serial No. 499,599

14 Claims. (Cl. 73—68)

This invention relates to improvements in mechanism for operating flow registering devices and means for preventing the entanglement with the mechanism of débris carried by the fluid being measured.

The primary object of the present invention is to provide a generally improved mechanism for measuring the volume of water flowing through a pipe line, said mechanism including an improved impulse turbine and débris shunting screen guarding the entrance of a passage leading to the turbine housing.

A further object of the invention is to provide a novel type of rotary screen which is maintained in motion by the flow of fluid passing thereby to throw off débris carried by the liquid.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a longitudinal sectional view through a portion of a pipe line in which the present meter device is inserted, the meter well being shown in section.

Figure 2 is a top plan view of the screened casing and the turbine casing with the cover plates thereof removed.

Figure 3 is an enlarged sectional view through the structure shown in Figure 2 taken upon the line 2—2 of this figure.

Referring more particularly to the drawings wherein like numerals of reference indicate corresponding parts throughout the several views, the numeral 1 indicates generally a water pipe which in the present case is shown as being concrete construction. In this pipe 1 there is interposed a pipe section 2 in the form of a Venturi tube, the end of the pipe 2 which is directed toward the source of supply of liquid flowing through the pipe being more or less sharply constricted at a point inwardly of this end as indicated at 3 to form the throat portion 4 from which point the pipe section gradually increases in diameter to the opposite end thereof as indicated at 5.

The wall of the pipe section 2 between the sharply constricted portion 3 thereof and the adjacent or what might be termed the up-stream end is provided with an opening 6 and a second opening is formed as at 7 at the narrowest or throat portion 4 of the pipe section. In the installation of the present rotary screen and meter operating structure, after the pipe section 2 has been placed in position, a well 8 is formed thereover to enclose the area within which the openings 6 and 7 are located so that the mechanism which is in communication with these openings will be protected by the well from the surrounding earth, the upper end of the well projecting above the ground line as shown.

Mounted upon the wall of the section 2 over and opening thereinto through the opening 6 is a casing 9 which has a removable top or cover plate 10. The wall of the casing 9 is provided with a tangentially disposed collar 11 which opens into the interior of the casing through the passage 12.

Disposed adjacent the casing 9 is a second casing 13 which constitutes the turbine housing, which has a removable cover plate 14 provided with a central interiorly threaded collar 15 which opens thereinto in the manner shown. The bottom of the casing 13 opposite the collar 15 has an aperture formed therethrough, which aperture is defined by a downwardly directed interiorly threaded collar 16 into which is extended one end of a return flow pipe 17, the other end of which extends through the aperture 7 in the pipe section 2.

The turbine casing 13 has an opening 18 formed through the wall thereof which is surrounded by a collar 19 which is disposed to enter the casing at a tangent to the circle of the interior thereof. A pipe section 20 connects the collars 11 and 19 of the two casings 9 and 13.

Within the casing 13 there is disposed a substantially U-shaped stirrup 21 which comprises a straight lower portion 22 and upstanding side portions 23, each of which at its upper end is attached to the cover plate 14 of the casing as indicated at 24. This stirrup carries intermediate the ends of the bottom or yoke portion 22 a pin 25 which provides a pivot bearing for the vane shaft 26, the lower end of which is provided with a suitable recess for the reception of the pin 25. Upon the lower end of this shaft 26 are mounted two or more curved blades or vanes 27 against which the water entering the casing 13 at a tangent, as described, impinges and causes rotation thereof and the shaft 26 attached thereto.

Secured at one end in the collar 15 is a tube 28 which is disposed vertically in the meter well 8, this tube carrying upon its upper end a register 29 suitably connected with the shaft 26 and geared to register the flow of water through the by-pass provided by the mechanism and thus indicate the quantity of water passing through the pipe 2.

The cover plate 10 of the casing 9 has secured in the central portion of the underface thereof a shaft 30 which extends downwardly therefrom through the opening 6 into the interior of the pipe section 2. Surrounding this shaft 30 is a tube 31 in the upper and lower ends of which are fixed the bearings 32 which are constructed of a special water lubricated rubber.

This tube is maintained in place about the shaft 30 by a washer 33 which is secured against the lower end of the shaft 30 by a screw 34, the washer overlying the end of the adjacent bearing 32 in the manner shown. Surrounding the lower end of the tube 31 is a hub 35 from which there extends radially a plurality of blades 36 which are curved longitudinally to extend inwardly toward the opening 6, these blades at their outer ends being joined to a ring 37 which is disposed within the opening as shown. Arranged within the upturned ends of the blades 36 and shaped to form a bowl is a screen body 39 which prevents the passage of débris from the pipe section 2 through the aperture 6 and into the turbine housing 13.

From the foregoing it will be seen that with the revolving screen 39 carried upon the vertical shaft 30 and with the blades 36 extending into the stream of water passing through the pipe section 2, constant rotation of the screen will be maintained by the water passing through the pipe and any débris which comes in contact with the screen will strike it at the up-stream side and will be carried around to the down-stream side where it will be washed free therefrom by the water in the pipe. The screen will thus be kept free from clogging material and the flow of water through the turbine will be uninterrupted so that constant operation of the meter mechanism will be maintained. By mounting the rotating screen upon the removable cover plate 10 it may be readily removed for inspection or replacement when necessary without disturbing the other elements of the structure and it will also be seen that the meter, supporting tube 28 and the turbine shaft and vanes may also be readily removed if necessary by simply taking off the cap or cover plate 14 of the turbine housing.

In operation the gradual decrease in the cross-sectional area of the pipe line to the throat 4 of the pipe section 2 causes the velocity of the water in motion to increase and this increase in velocity at the throat causes a decrease of pressure at this point and consequently a decrease of pressure at the end of the pipe 17. This decrease in pressure at the end of the pipe 17 causes water to flow through the opening 6 and through the casings 9 and 13 in proportion to the volume flowing through the pipe line. Thus the volume or quantity of water flowing through the meter is registered on numbered dials actuated by suitable mechanism driven by the shaft 26 of the turbine. The details of these dials and actuating mechanism are not shown as these may be of any suitable or usual construction.

Having thus described my invention, what I claim is:—

1. A fluid meter for pipe lines including a Venturi tube having an opening at the throat and an opening upstream of the throat, comprising a pair of casings, one being in communication with the Venturi tube through the opening upstream of the throat and the other casing being in communication with the tube through the opening at the throat, a screen covering the communicating opening between the first casing and the tube, means supporting the screen permitting rotation thereof, a turbine within the other casing, flow registering means, a shaft rotated by said turbine and connected with said registering means to operate the same, and a pipe coupling said casings and disposed to discharge into the turbine casing at a tangent to the circular inner wall thereof.

2. A fluid meter for pipe lines including a Venturi tube having an opening at the throat and an opening upstream of the throat, comprising a pair of casings, one being in communication with the Venturi tube through the opening upstream of the throat and the other casing being in communication with the tube through the opening at the throat, a shaft mounted in said first casing, a screen covering the communicating opening between the first casing and said tube, blades rotatably carried by the shaft and carrying said screen for rotation therewith, said blades being rotated by water passing through the opening, a turbine within the other casing, flow registering means, a shaft rotated by said turbine and connected with said registering means to operate the same, and a pipe coupling said casing and disposed to discharge water from the first casing into the second casing in a manner to cause rotation of said turbine.

3. A fluid meter for pipe lines including a Venturi tube having an opening at the throat and an opening upstream of the throat, comprising a pair of casings, one being in communication with the Venturi tube through the opening upstream of the throat and the other casing being in communication with the tube through the opening at the throat, a shaft mounted in said first casing, a screen covering the communicating opening between the first casing and said tube, blades rotatably carried by the shaft and carrying said screen for rotation therewith, said blades being rotated by water passing through the opening, a turbine within the other casing, flow registering means, a shaft rotated by said turbine and connected with said registering means to operate the same, and a pipe coupling said casings and disposed to discharge water from the first casing into the second casing in a manner to cause rotation of said turbine, said blades being arranged to extend into said tube to be acted upon also by water passing through the tube.

4. A fluid meter for pipe lines including a Venturi tube having an opening at the throat and an opening upstream of the throat, comprising a pair of casings, one thereof having an open side in communication with the Venturi tube through the opening upstream of the throat, the other casing being in communication with the tube through the opening at the throat, a removable plate closing the side of the first mentioned casing opposite the open side, a shaft secured at one end to the inner face of said plate at the center thereof and projecting through the opposite open side into said tube, a hub carried by said shaft at the other end thereof, blades carried by and projecting radially from said hub, a ring secured to and carried by said blades and disposed within the opening of the tube, a screen carried by said blades and covering said opening, a turbine within the other casing, flow registering means disposed above the turbine casing, a shaft rotated by said turbine and connected with said registering means to operate the same, and a pipe connecting said casings.

5. A fluid meter for pipe lines including a Venturi tube having an opening at the throat and an opening upstream of the throat, comprising a pair of casings, one being in communication with the Venturi tube through the opening upstream of the throat, the other casing being in communication with the tube through the opening at the throat, a screen covering the communicating opening between the first mentioned casing and the tube, a removable cover plate for the second casing, a substantially U-shaped stirrup suspended in said second casing from the cover plate thereof, an upstanding pivot pin carried by said stirrup and disposed centrally of the casing, a turbine within the casing including a shaft, said shaft having a recess in one end to receive said pivot pin, a tube carried by said cover plate and extending upwardly from the turbine casing and housing said shaft, flow registering means supported by said tube and having said shaft connected therewith for operation thereby, and a pipe connecting said casings and disposed for the discharge of water into the turbine casing at a tangent to a circle concentric therewith.

6. The combination with a flow registering mechanism for a pipe line, including a Venturi tube in the line having an opening at the throat and an opening upstream of the throat, a bypass connected at the ends with said openings and flow registering means actuated by fluid flowing through the bypass; of a screen guard covering the opening upstream of the throat, and means supporting said screen permitting its free rotation to turn débris away from the opening covered thereby.

7. The combination with a flow registering mechanism for a pipe line, including a Venturi tube in the line having an opening at the throat and an opening upstream of the throat, a bypass connected at the ends with said openings and flow registering means actuated by fluid flowing through the bypass; of a screen guard covering the opening upstream of the throat, a plurality of propeller blades extending radially from the center of said screen upon the side thereof within the tube, and means providing a rotatable support for the screen whereby the same may be turned about the said center by fluid striking said blades to turn débris away from the opening covered by the screen.

8. The combination with a flow registering mechanism for a pipe line having a restricted area and a small diameter fluid passage connected at one end with said line up-stream from said area and leading back to the line through said area and said flow registering means actuated by the fluid passing through said passage; of rotating means guarding the end of said passage through which the fluid enters from the pipe line, for turning away from said passage end débris carried by the fluid.

9. The combination with a flow registering mechanism for a pipe line having a restricted area and a small diameter fluid passage connected at one end with said line up-stream from said area and leading back to the line through said area and said flow registering means actuated by the fluid passing through said passage; of rotatably mounted means rotated by the fluid passing through the pipe line and operating to turn away from said passage end débris carried by the fluid.

10. In a pipe line having a restricted area, a fluid passage connected at one end with said line up-stream from said area and leading back to the line through said area and mechanism operated by the fluid passing through the passage, a circular basket-like screen disposed with its edge in that end of the passage through which fluid enters from the pipe line, the concave side of said screen being directed into the passage opening, means for supporting the screen for rotation about an axis concentric with the passage opening, and blade members mounted upon the convex side of the screen and disposed within the pipe line to be operated upon by the water flowing through the pipe to effect the rotation of the screen.

11. In a mechanism for registering the flow of fluid through a pipe line and including a small diameter pipe laterally disposed with respect to the pipe line and having its two ends opening into the pipe line, means for effecting a differential pressure in the pipes whereby a portion of the fluid contents of the pipe line is turned off to flow through the small diameter pipe, and means comprising a rotatable element disposed at that end of the small diameter pipe through which the fluid from the main pipe enters the small diameter pipe, for turning away from the said end of the small diameter pipe débris carried by the fluid, said last named means being rotated by the fluid.

12. The combination with a flow registering mechanism for a pipe line having a restricted area and a small diameter fluid passage connected at one end up-stream from said area and leading back into the line through said area and said flow registering means actuated by the fluid passing through said passage; of movable baffle means guarding the end of said passage through which the fluid enters from the pipe line, for turning away from said passage end débris carried by the fluid, and means operated by the fluid in the pipe line for moving the baffle.

13. In a mechanism for registering the flow of fluid through a pipe line and including a laterally disposed passage of smaller area than the pipe line, having two ends opening into the line, means for effecting a differential pressure in the line and passage whereby a portion of the fluid in the line is turned into the passage to flow therethrough, screening means over the end of said passage through which the fluid enters from the pipe line, and means to turn the side of the screening means at the up-stream edge of said passage end over which it lies, to the downstream edge of the passage end, whereby débris lying thereagainst will be washed off by fluid in the line.

14. In a mechanism for registering the flow of fluid through a pipe line and including a laterally disposed passage of smaller area than the pipe line, having two ends opening into the line, means for effecting a differential pressure in the line and passage whereby a portion of the fluid in the line is turned into the passage to flow therethrough, a rotatably mounted screen covering the end of the passage through which fluid enters from the pipe line, and means for effecting the continuous rotation of the screen.

HAROLD H. KIDDER.